(12) United States Patent
Kataoka et al.

(10) Patent No.: US 8,243,566 B2
(45) Date of Patent: Aug. 14, 2012

(54) CORRECTING TEMPERATURE CHARACTERISTIC OF OPTICAL PICKUP OF AN OPTICAL DISK RECORDING/REPRODUCING APPARATUS

(75) Inventors: Takeyoshi Kataoka, Yokohama (JP); Nobuo Nakai, Yokohama (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 37 days.

(21) Appl. No.: 12/560,082

(22) Filed: Sep. 15, 2009

(65) Prior Publication Data

US 2010/0074068 A1    Mar. 25, 2010

(30) Foreign Application Priority Data

Sep. 24, 2008    (JP) ................................. 2008-243872

(51) Int. Cl.
*G11B 7/00*    (2006.01)
(52) U.S. Cl. .................. 369/44.32; 369/53.42
(58) Field of Classification Search .................. None
See application file for complete search history.

(56) References Cited

U.S. PATENT DOCUMENTS

| 7,558,178 B2 * | 7/2009 | Kurokawa et al. ....... 369/112.01 |
| 2001/0028614 A1 * | 10/2001 | Furukawa .................. 369/44.32 |
| 2004/0090882 A1 * | 5/2004 | Saimi et al. ................ 369/44.23 |

FOREIGN PATENT DOCUMENTS

| JP | 2006-202375 | 8/2006 |
| JP | 2008-097775 | 4/2008 |

OTHER PUBLICATIONS

English Translation of Chinese Office Action issued in corresponding Chinese Patent Application No. 200910009416.9 dated May 5, 2011.

* cited by examiner

*Primary Examiner* — Joseph Haley
(74) *Attorney, Agent, or Firm* — McDermott Will & Emery LLP

(57) ABSTRACT

There is a need to provide correction of a temperature characteristic of an optical pickup of an optical disk recording/reproducing apparatus, in which items of the optical pickup including spherical aberration may be improved in temperature characteristic. To achieve the need, an optical disk drive is characterized by correcting a spherical aberration correction element when variation of a signal from the control circuit to the driver and/or a tracking or focusing error signal supplied to the controller has a value equal to or more than a predetermined value.

8 Claims, 4 Drawing Sheets

(a)

DISK D (b)

DISK C (a)

(b)

CORRECTING TEMPERATURE CHARACTERISTIC OF OPTICAL PICKUP OF AN OPTICAL DISK RECORDING/REPRODUCING APPARATUS

BACKGROUND

In a field of an optical disk drive, a DVD (Digital Versatile Disc) has been generally used as a recording medium, and now use of a BD (Blu-ray Disc) begins to spread. BD still further increases recording density and therefore increases recordable time in video recording or the like. On the other hand, stricter specifications are set forth for components including an optical pickup. For example, change in characteristics depending on temperature is strictly specified.

Therefore, a plastic lens is hardly used for an objective lens of an optical pickup for BD since it has significantly variable characteristics including spherical aberration, and a glass lens is used for the objective lens. BD is different in this point from DVD or CD, which has been a problem for achieving cost reduction. To correct a temperature characteristic of an objective lens, it is first necessary to accurately know temperature of the objective lens. Although a typical optical pickup has a temperature sensor, the sensor is not always provided in a position at which the sensor may accurately measure temperature of an objective lens.

On the other hand, patent document JP-A-2008-97775 discloses a method where an objective lens is attached to a lens holder via a fixing member having high heat conductivity, and a temperature sensor is provided on the fixing member to accurately determine the temperature of the objective lens.

SUMMARY

The method disclosed in the patent document JP-A-2008-97775 gives one solution for the above problem. However, the method requires an additional temperature sensor. This increases cost, and increases load of an actuator mounted with the objective lens, which is undesirable for excellent controlling focus and tracking.

Hence, there is a need to provide an optical disk recording/reproducing apparatus and a method of correcting temperature characteristics of an optical pickup of the optical disk recording/reproducing apparatus, which solve the problem, and particularly to provide an optical disk recording/reproducing apparatus and a method of correcting a temperature characteristic of an optical pickup of the optical disk recording/reproducing apparatus, in which items of the optical pickup including spherical aberration may be improved in temperature characteristic.

An example of an optical disk drive includes a laser diode that generates laser light, an objective lens that condenses the laser light from the laser diode onto an optical disk, an actuator that drives the objective lens, a spherical aberration correction element that corrects spherical aberration, a driver that sends drive power to the actuator and the spherical aberration correction element, and a control circuit that controls the driver. To achieve the need, the control circuit of such an optical disk drive according to an example is characterized by having controlling the driver such that when variation of a signal from the control circuit to the driver has a value equal to or more than a predetermined value, the driver moves the spherical aberration correction element.

Moreover, the example includes an optical disk recording/reproducing apparatus, which uses an optical disk as a recording medium, and has an optical pickup that records and reproduces a signal into/from the recording medium. The optical pickup has a laser diode that generates laser light for performing the recording and reproducing and an objective lens for irradiating the laser light from the laser diode onto the recording medium and condensing reflected light from the recording medium. The optical pickup also has an actuator mounted with the objective lens that performs at least focus adjustment of the objective lens, tracking adjustment of the lens to a recording track of the recording medium, and tilt adjustment for adjusting tilt of the lens during facing the recording medium. A spherical aberration correction element in the optical pickup corrects spherical aberration of the objective lens. The optical pickup also has a detector that detects laser light condensed by the objective lens and converts the light into an electric signal, and a temperature sensor that detects internal temperature of the optical pickup. The optical disk recording/reproducing apparatus has a signal generation circuit that calculates the electric signal outputted from the detector to generate at least a focusing error signal and a tracking error signal. A focus-drive-signal generation circuit generates a focus drive signal for focus adjustment of the actuator based on the focusing error signal generated by the signal generation circuit. The optical pickup also has a tracking-drive-signal generation module that generates a tracking drive signal for tracking adjustment of the actuator based on the tracking error signal generated by the signal generation circuit, a signal variation measurement module that measures signal variation of at least one of the focusing error signal, the tracking error signal, the focus drive signal, and the tracking drive signal, and a spherical-aberration-correction drive signal generation circuit that determines the signal variation measured by the signal variation measurement circuit and generates a spherical-aberration-correction drive signal in the case that the signal variation is larger than a predetermined value. In this example, the optical pickup also has a spherical-aberration-correction element drive circuit that is inputted with the spherical-aberration-correction drive signal from the spherical-aberration-correction drive signal generation module to drive the spherical aberration correction element.

Moreover, another disclosed example includes a method of correcting a temperature characteristic of an optical pickup of an optical disk recording/reproducing apparatus that uses an optical disk as a recording medium, and has the optical pickup that records and reproduces a signal into/from the recording medium. The method involves an initial correction step of correcting a temperature characteristic of the optical pickup based on internal temperature of the optical pickup. In a first temperature measurement step, least a focusing error signal and a tracking error signal from output of the optical pickup are generated, and a measure of temperature is obtained as the sum of amount of temperature rise of an objective lens mounted on the optical pickup. In this step, the amount of temperature rise is measured based on variation of a signal generated in a system control circuit based on the focusing error signal or the tracking error signal, and the internal temperature of the optical pickup. A recording/reproducing step performs a recording/reproducing operation using the optical pickup. A second temperature measurement step involves generating at least a focusing error signal and a tracking error signal from output of the optical pickup after the recording/reproducing operation of the recording/reproducing step is started. The second temperature measurement step also involves obtaining temperature as the sum of amount of temperature rise of the objective lens mounted on the optical pickup, the amount of temperature rise being measured based on variation of a signal generated in the system control circuit based on the focusing error signal or the tracking error signal, and the internal temperature of the optical pickup. The exemplary method also includes an additional correction step of additionally correcting aberration caused by temperature change of the optical pickup based on the temperature obtained in the second temperature measurement step in the case that an absolute value of difference between the temperature obtained in the first temperature measurement step and the temperature obtained in the second temperature measurement step is larger than a predetermined value. In this way, the temperature characteristic is corrected based on variation of an electric signal.

According to the examples, an optical disk recording/reproducing apparatus and a method of correcting a temperature characteristic of an optical pickup of the optical disk recording/reproducing apparatus are advantageously provided, in which items of the optical pickup including spherical aberration may be improved in temperature characteristic.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Hereinafter, a preferred example is described with reference to drawings. The apparatus shown in FIG. 1 includes a system control circuit 130, for control of recording and/or reproducing operation. The circuit 130 is configured to implement functions represented by modules 131-137 in FIG. 1. The modules may by individual circuits; or the circuit 130 may be a programmable device (e.g. microprocessor, digital signal processor, or combination thereon), in which each of the modules may be programming that causes the device to implement the respective functions.

Figure 1:
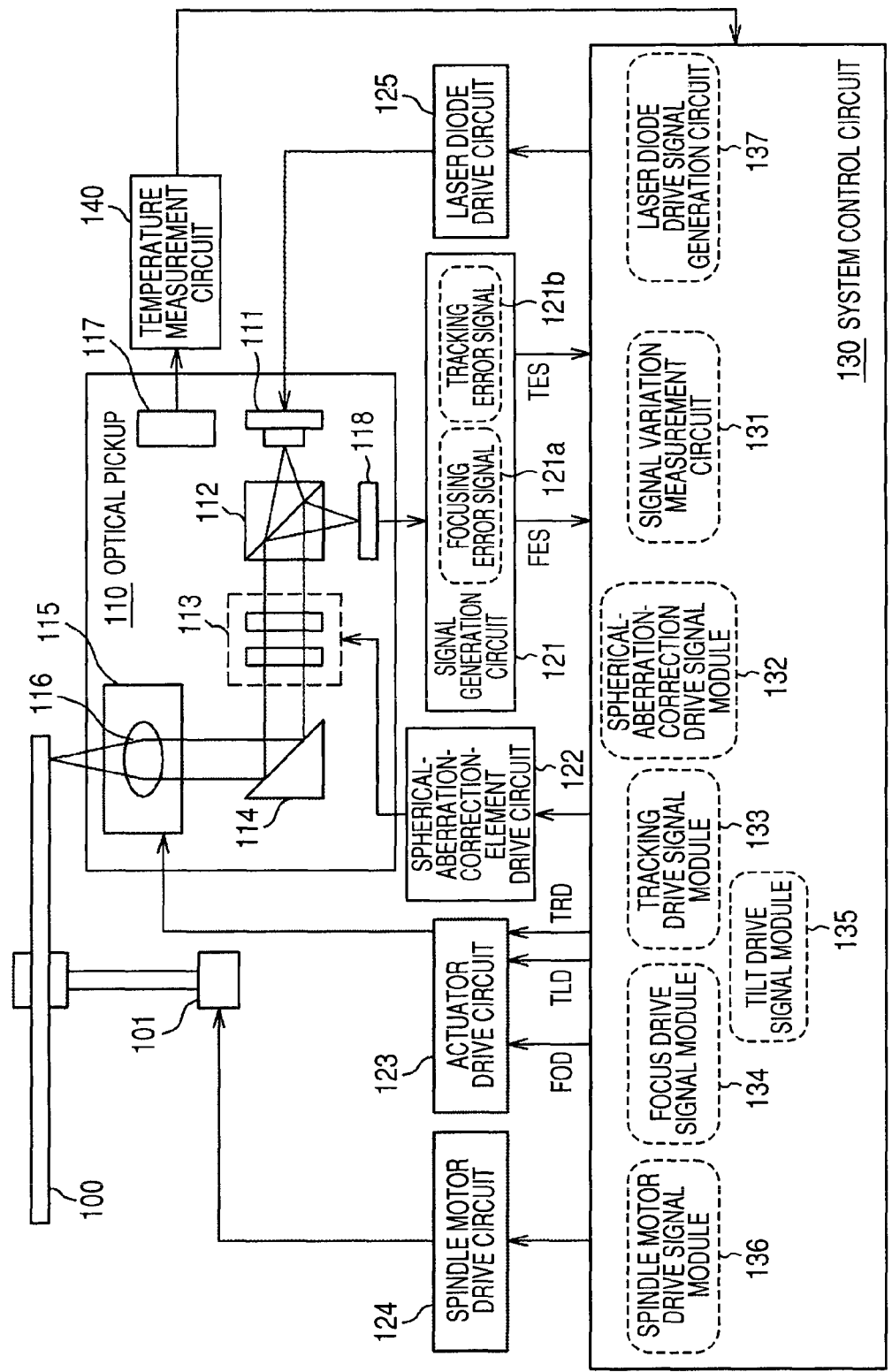
FIG. 1 is a system block diagram showing an example of an optical disk recording/reproducing apparatus.

First, operation of an optical disk recording/reproducing apparatus is described according to a system block diagram shown by way of an example in FIG. 1.

First, recording/reproducing operation of an information signal is described. A spindle motor drive signal generation circuit 136 as a part of a system control circuit 130 generates a spindle motor drive signal for rotating an optical disk 100 at a speed depending on a recording/reproducing position. The drive signal is provided to a spindle motor 101 that rotates the optical disk 100 via a spindle motor drive circuit 124. Consequently, the optical disk 100 is rotationally driven at a predetermined speed.

When the information signal is recorded, a laser diode drive signal generation circuit 137 as a part of the system control circuit 130 generates a laser diode drive signal based on an information signal to be recorded, and drives a laser diode 111 in an optical pickup 110 via a laser diode drive circuit 125. The laser diode 111 generates laser light for information recording. The laser light is provided to an objective lens 116 mounted on an actuator 115 via a beam splitter 112, a spherical aberration correction element 113, and a mirror 114, and then focused on a recording surface of the optical disk 100.

When the information signal recorded in the optical disk 100 is reproduced, laser light is irradiated from the laser diode 111 to the optical disk 100, and reflected light of the laser light travels through the objective lens 116, the mirror 114, and the spherical aberration correction element 113, and then the reflected light is reflected by a reflection surface of the beam splitter 112, and focused onto a detector 118 and converted into an electric signal therein. Then, the electric signal is provided to a signal generation circuit 121. The electric signal being output of the detector 118 may be supplied to a reproduction signal processing circuit (not show), wherein the electric signal is corrected in code error caused during a recording/reproducing process, and then returned into original data, a video signal, such as a voice signal or the like.

Next, a method of controlling each of devices in the system control circuit 130 is described. Here, a method of controlling each of the actuator 115 and the spherical aberration correction element 113 is particularly described.

The signal from the optical pickup 110 is converted into the electric signal in the detector 118, and then the electric signal is provided to a signal generation circuit 121. The signal from the optical pickup 110 can be obtained in response to reflected light from the optical disk 100 in either operation of recording and reproducing. The signal generation circuit 121 includes a focusing error signal generation circuit 121a and a tracking error signal generation circuit 121b. These circuits calculate the signal provided from the detector 118 to obtain a focusing error signal FES and a tracking error signal TES respectively, and drive the actuator 115 that adjusts a position or direction of the objective lens 116 with respect to the optical disk 100 based on the respective error signals. Detection is made on change in reflected light from the objective lens 116 being finely adjusted by the actuator 115, whereby the objective lens 116 can be controlled to focus light onto the recording surface of the optical disk 100, and perform track trace of a center of a recording track.

The focusing error signal FES is provided to a focus-drive-signal generation circuit 134 through a filter circuit (not shown) that removes a high-frequency component from the signal to extract a component in a control frequency band. Then, the signal is amplified in power by the focus-drive-signal generation circuit 134 and thus a focus drive signal FOD is generated. The signal FOD drives the actuator 115 via an actuator drive circuit 123, thereby the objective lens 116 may focus laser light onto the recording surface of the optical disk 100.

On the other hand, the tracking error signal TES is similarly provided to a tracking-drive-signal generation circuit 133 through a filter circuit (not shown) that removes a high-frequency component from the signal to extract a component in a control frequency band. Then, the signal is amplified in power by the tracking-drive-signal generation circuit 133 and thus a tracking drive signal TRD is generated. The signal TRD drives the actuator 115 via the actuator drive circuit 123, thereby the objective lens 116 may track a center of a recording track of the optical disk 100.

In addition, the actuator drive circuit 123 is supplied with a tilt drive signal TLD from a tilt-drive-signal generation circuit 135. The signal corrects tilt of the objective lens 116 to the optical disk 100, and controls the objective lens 116 such that even if the optical disk 100 is slightly differently mounted, the objective lens correctly faces the optical disk 100.

The focus and tracking obviously need to be controlled while the optical disk 100 is subjected to recording/reproducing operation by the recording/reproducing apparatus. However, tilt has been typically controlled so far in such a manner that the objective lens is merely subjected to preset adjustment with respect to an optical disk to be used, or correction amount of tilt is changed depending on a radial position of the objective lens 116 because tilt of the optical disk is different depending on the radial position.

Next, a spherical-aberration-correction drive signal generated by a spherical-aberration-correction drive signal generation circuit 132 is provided to a spherical-aberration correction element 113 via a spherical-aberration correction element drive circuit 122, so that the spherical-aberration correction element 113 is driven to correct spherical aberration on an inserted optical disk 100 so as to obtain excellent recording/reproducing performance.

A method of correcting spherical aberration or tilt, including correction of a temperature characteristic is often different depending on a lens to be used. For example, in the case that a glass lens is used for the objective lens 116, since it has an insignificant temperature characteristic, the spherical-aberration correction element 113 simply performs preset adjustment of correction in many cases. In the case that a plastic lens is used, since it has a significant temperature characteristic compared with the glass lens, a correction is needed for the temperature characteristic of the lens is needed in many cases.

Next, additional features of the example of FIG. 1 are described.

A temperature characteristic of spherical aberration of objective lens 116 may be corrected using internal temperature of the optical pickup 110 measured by a temperature sensor 117 as a trigger. However, the temperature sensor 117 is not always provided close to the objective lens 116. In addition, if the temperature sensor is provided in a position adjacent to the objective lens in order to accurately measure temperature of the objective lens 116, load of the actuator 115 undesirably increases.

A feature of the example is that accurate temperature of the objective lens for the spherical aberration correction is measured from variation of each of the focusing error signal FES and the tracking error signal TES, or each of the focus drive signal FOD and the tracking drive signal TRD. For ex ample, it is acceptable that FES and TES are provided to a signal variation measurement circuit 131, and a signal corresponding to measured variation is supplied to the spherical-aberration-correction drive signal generation circuit 132. Alternatively, even if signals generated in the system control circuit 130 such as FOD and TRD are provided to the signal variation measurement circuit 131 in place of FES and TES, the circuits 131 and 132 may similarly work to correct spherical aberration for the temperature characteristic of the objective lens 116.

Thus, a temperature characteristic of spherical aberration of the objective lens 116 is corrected at high accuracy compared with a typical case, and for example, a plastic lens can be used for an objective lens of a recording/reproducing apparatus using BD as a recording medium. It will be appreciated that the correction technique is not limited to the apparatus using BD, and the method may be effectively used for a recording and/or reproducing apparatus for DVD, CD, or multilayer disk having a plurality of recording layers being likely to be generalized. The method may be applied to an apparatus using a glass lens.

Figure 2:
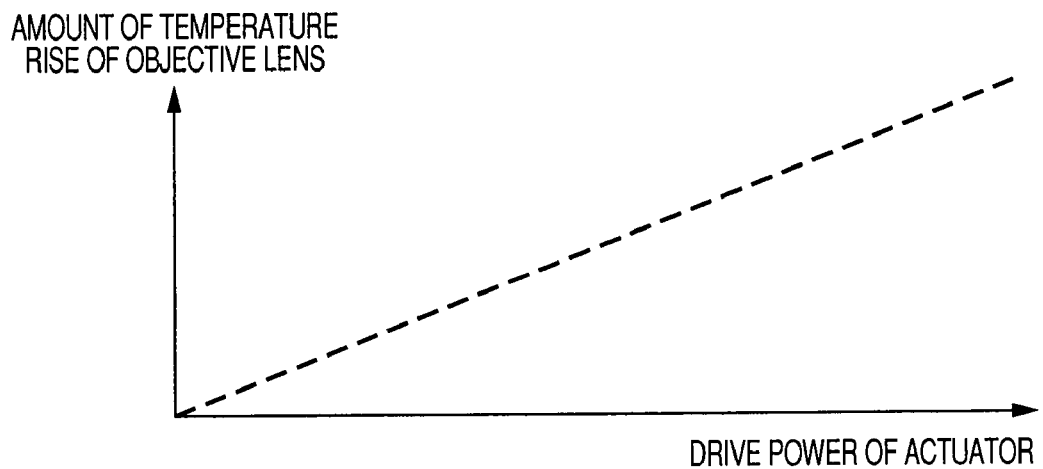
FIG. 2 is a characteristic diagram showing an example of a relationship between drive power of an actuator and amount of temperature rise of an objective lens.
Figure 3:
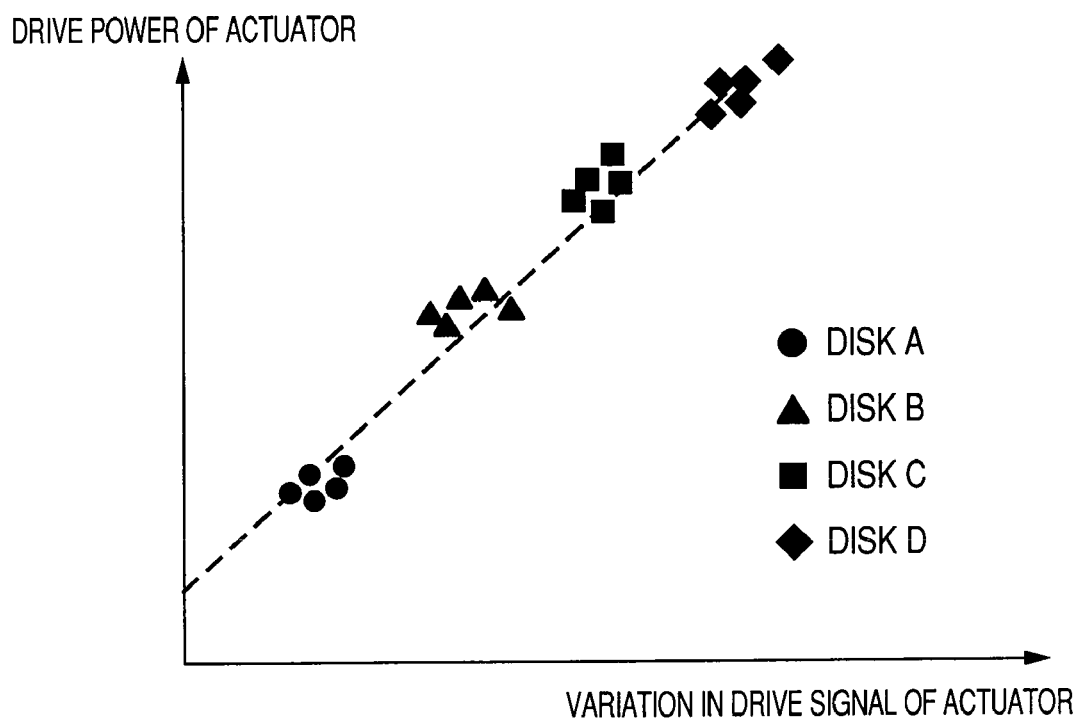
FIG. 3 is a characteristic diagram showing an example of a relationship between variation of a drive signal of the actuator and drive power thereof.
Figure 4:
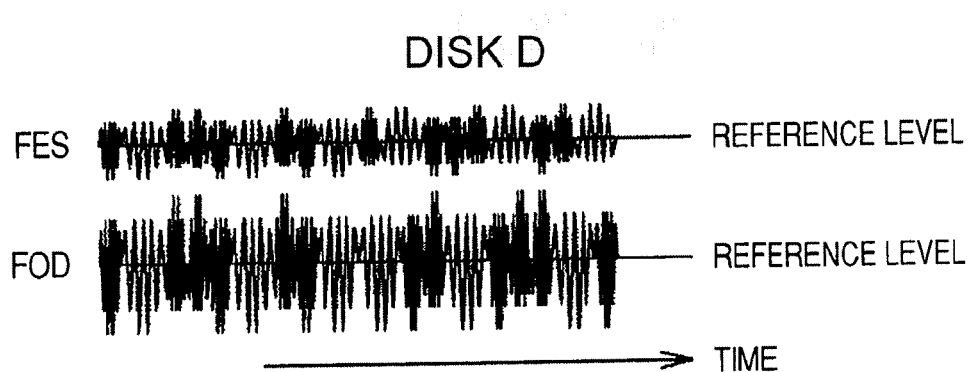
FIGS. 4(a) and 4(b) show waveform diagrams exemplifying change with time of each of a focusing error signal FES and a focus drive signal FOD.
Figure 4:
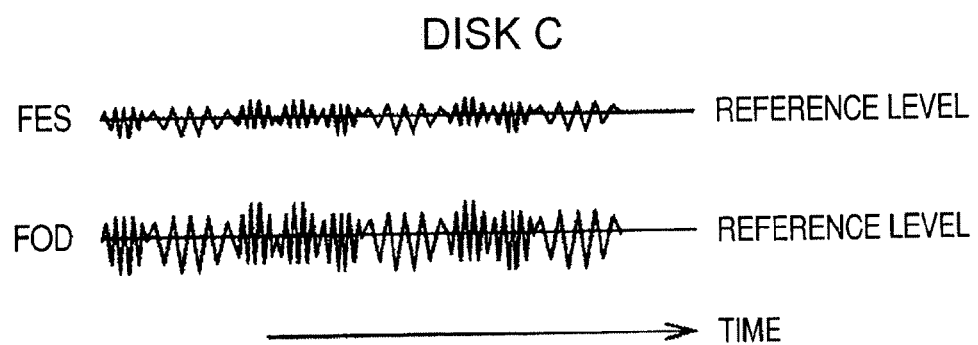

Next, a method of correcting for the temperature characteristic of spherical aberration is described using FIGS. 2 to 4.

FIG. 2 shows an example of a characteristic diagram showing a relationship between drive power in driving the actuator 115 and amount of temperature rise of the objective lens 116. As clear from FIG. 2, a clear correlation is observed between amount of temperature rise of the objective lens (vertical axis of the figure) and drive power outputted from the actuator drive circuit 123 (horizontal axis of the figure). It is seen that temperature rise of the objective lens largely occurs due to power consumption caused by driving the lens actuator 115. This shows that even if the objective lens 116 itself does not have a temperature sensor, the temperature rise can be substantially measured through measuring such drive power. However, it is undesirable to add a component for directly measuring power in the light of cost unlike a case of measuring voltage or current.

FIG. 3 shows an example of a characteristic diagram showing a relationship between variation of a drive signal of the actuator 115 and drive power thereof. The former (horizontal axis of the figure) is obtained by a signal-variation measurement circuit 131 in FIG. 1, and shows variation amplitude of each of FES and TES or each of FOD and TRD, wherein causes of the variation include noise in reflected light and eccentricity or axial runout of an optical disk. The latter (vertical axis of the figure) is the same as the horizontal axis of FIG. 2. The drive power of the actuator is different depending on a type of a disk as shown by disks A to D in the figure. For example, a RAM disk requires large actuator drive power compared with an R disk. Moreover, a double-sided disk, having different formats between both sides, tends to require increased actuator drive power. Even for disks of the same type, drive power somewhat varies for each of disks. As clear from FIG. 3, a clear correlation is observed between drive power of the actuator and variation of a drive signal of the actuator. Noise in FES or TES has an amplitude level similar to that of FES or TES as a main signal unlike a signal including content information such as video or voice being recorded or reproduced. Therefore, the drive power of the actuator is dominated by magnitude of noise or magnitude of eccentricity or axial runout of an optical disk, so that the above correlation is established.

FIGS. 4(a) and 4(b) are waveform diagrams showing an example of change with time of each of the focusing error signal FES and the focus drive signal FOD. While not shown, similar waveform diagrams are obtained for the tracking error signal TES and the tracking drive signal TRD. A disk D requiring the largest drive power in FIG. 3 has waveforms of FES and FOD as shown in FIG. 4(a), and a disk C requiring second-largest drive power has waveforms of FES and FOD as shown in FIG. 4(b). In each case, variation with a short period is mainly caused by a noise component. Noise amplitude is large in FIG. 4(a) compared with FIG. 4(b), and the former is naturally larger in power for driving the actuator 115. While a waveform of FES is similar to that of FOD, FOD is given by filtering a component in a control frequency band from FES, and furthermore amplifying power as described before.

From FIGS. 2 and 3, it is known that a clear relationship exists between amount of temperature rise of the objective lens 116 (vertical axis of FIG. 2) and signal variation of the drive signal of the actuator (horizontal axis of FIG. 3). Therefore, temperature rise of the objective lens can be known from signal variation of each of FES and TES or each of FOD and TRD, and consequently a temperature characteristic of spherical aberration or the like can be corrected. Here, the signal variation is used, and in the case of FIG. 1, it is enough that the signal variation measurement circuit 131 measures variation of voltage or current of each of FES, TES, FOD and TRD, therefore a configuration for measuring power is unnecessary unlike the above case. Whether voltage or current is to be measured may be optionally determined depending on convenience of circuit design, and either case is within the scope of the examples discussed herein.

The amount of temperature rise obtained from signal variation of the actuator drive signal means amount of temperature rise with respect to internal temperature of the optical pickup 110 measured by the temperature sensor 117. Such increased temperature is added to the internal temperature, thereby temperature of the objective lens 116 itself can be obtained.

FIG. 1 shows a case that the signal variation measurement circuit 131 uses at least one of FES, TES, FOD and TRD to measure signal variation of the relevant signal. The signal variation is provided to the spherical-aberration-correction drive signal generation circuit 132 as a parameter showing amount of temperature rise of the objective lens 116, so that a temperature characteristic of spherical aberration of the objective lens 116 is highly accurately corrected.

In this way, the temperature characteristic is accurately corrected compared with a typical prior case. Thus, for example, even in the case of using BD as a recording medium, a plastic lens may be used for an objective lens.

Furthermore, in FIG. 1, a measurement result by the signal variation measurement circuit 131 may be supplied to not only the spherical-aberration-correction drive signal generation circuit 132, but also to the focus-drive-signal generation circuit 134, the tilt-drive-signal generation circuit 135, and/or the laser-diode-drive-signal generation circuit 137. In this case, the method of correcting the temperature characteristic by knowing temperature of the objective lens 116 itself may be applied to not only correction of spherical aberration, but also correction of a temperature characteristic in focus or tilt. Regarding focus, in the case that a shape of the objective lens 116 is changed depending on temperature, or in the case that refractivity of a material has a temperature characteristic, the temperature characteristic is effectively corrected. Similarly, regarding tilt, in the case that coma aberration, occurring depending on an angle condition of the optical disk 100 or the objective lens 116, has a significant temperature characteristic, the temperature characteristic can be corrected using the technique described above. In addition, light quantity of the laser diode 111 may be controlled such that constant light quantity is obtained independently of a temperature characteristic of light transmittance of each of the optical system components including the objective lens 116. In this way, the example can be widely applied to correction of temperature characteristics of further various items in the optical pickup 110.

While the components that generate drive signals used for correcting the temperature characteristic were shown as the circuits 132, 134, 135 and 137 in FIG. 1, this is not a limiting condition of the example. For example, how to change respective components of the optical pickup 110 to correct the temperature characteristic maybe learned beforehand based on a measurement result by the signal variation measurement circuit 131. A learning table is prepared from the measurement result, and the table is reflected in firmware mounted or stored in a recording/reproducing apparatus. Correction of the temperature characteristic then can be made using the learning table. This case is also within a scope of the example.

It is not always necessary that the temperature characteristic correction using the measurement result by the signal variation measurement circuit 131 is temporally continuously performed. While described later using FIG. 5, temperature characteristic correction may be additionally made in the case that a value of temperature is changed to a predetermined value or more after a temperature characteristic was previously corrected. In this case, for example, a hold circuit is preferably provided in an output side of the signal variation measurement circuit 131.

Figure 5:
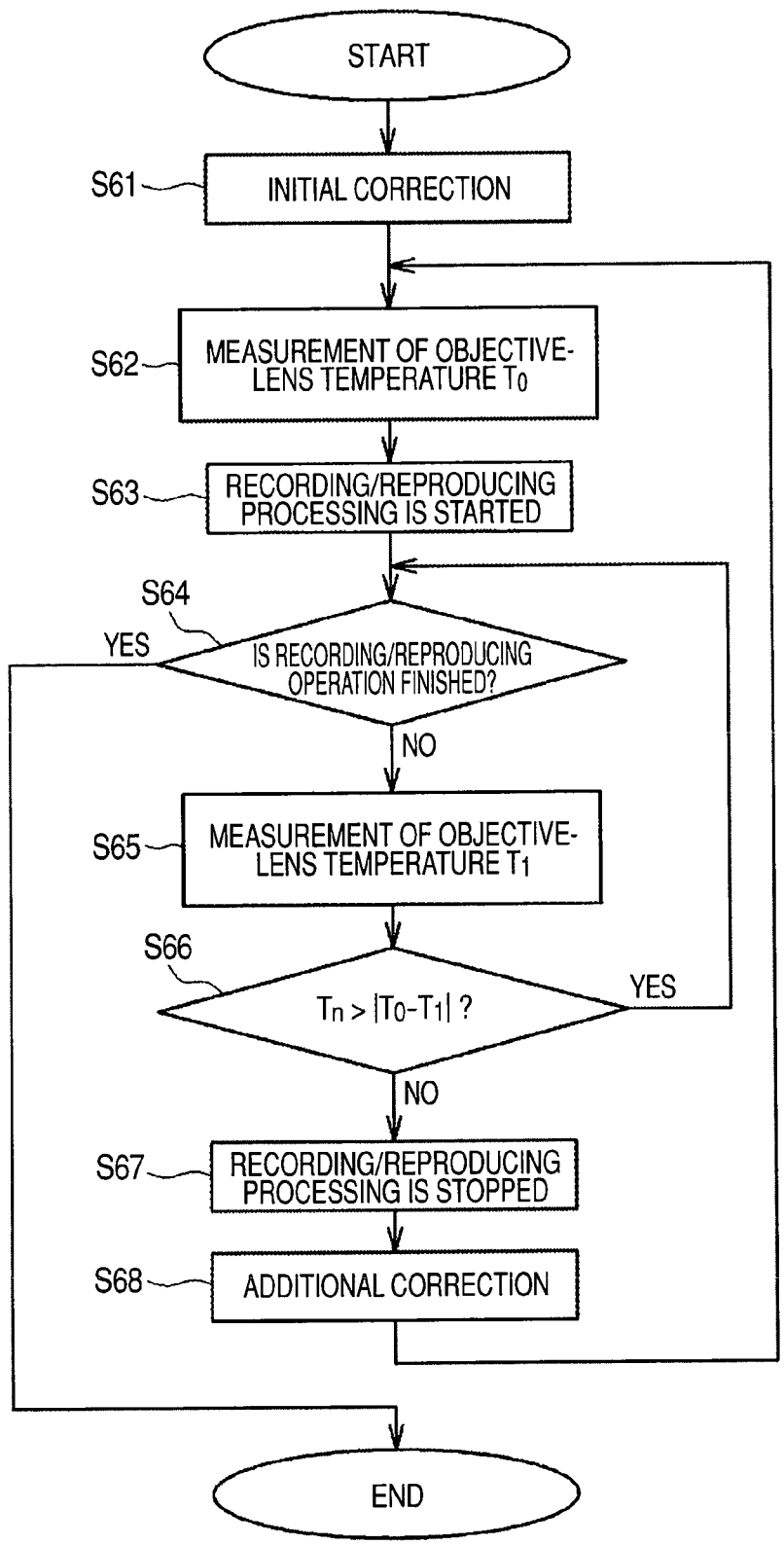
FIG. 5 is an operation flowchart showing an example of a procedure for correcting spherical aberration.

Next, an operation is described using the flowchart of FIG. 5 by way of an example. While a case of correcting respective temperature characteristics of spherical aberration, focus offset, tilt and laser power among those described using FIG. 1 is described here, a case of correcting some of them, for example, correcting only spherical aberration is also within a scope of the example of FIG. 5.

First, in step S61, for example, when the optical disk 100 is mounted on a recording/reproducing apparatus, spherical aberration, focus offset, tilt and laser power are adjusted, so that initial correction of temperature characteristics is finished.

In step S62, amount of temperature rise of the objective lens is obtained from signal variation measured by the signal variation measurement circuit 131 during the adjustment, and the amount is added to the internal temperature measured by the temperature sensor 117, so that temperature T0 of the objective lens itself is obtained.

Next, in step S63, processing associated with recording/reproducing operation into/from the optical disk 100 is started.

After a certain time, in step S64, determination is made on whether the recording/reproducing operation is already stopped and the processing associated with the operation is finished. When the processing is already finished (Yes in the figure), the operation flow is finished without newly performing operation for correcting the temperature characteristics.

When the processing is not finished yet (No branch from S64 in the figure), in step S65, temperature T1 of the objective lens itself at that point is obtained by adding amount of temperature rise of the objective lens 116 obtained from signal variation measured by the signal variation measurement circuit 131 to the internal temperature measured by the temperature sensor 117.

Next, in step S66, determination is made on whether or not an absolute value of difference between the previous temperature T0 and the temperature T1 after the certain time is smaller than predetermined temperature difference Tn. The predetermined temperature difference Tn is preferably determined as temperature difference above which a temperature characteristic needs to be newly corrected.

As a result of determination in the step S66, in the case that the absolute value of difference between T0 and T1 is smaller than Tn (Yes in the figure), since the temperature characteristics need not be additionally corrected, processing is returned to the step S64 and the same operation is repeated.

As a result of determination in the step S66, in the case that the absolute value of difference between T0 and T1 is equal to Tn or larger than Tn (No in the figure), since the temperature characteristics need to be additionally corrected, recording/reproducing processing is stopped in step S67, and spherical aberration, focus offset, tilt and laser power are additionally corrected so as to be suitable for a case that temperature of the objective lens is T1 in step S68.

Next, processing is returned to the step S62 and temperature T0 is measured at the point, then the same operation is repeated.

In the above, recording/reproducing processing is stopped in the step S67, and processing is restarted in the step S63. However, information signals are stored in a buffer memory having a capacity corresponding to time required for the additional correction, thereby the additional correction can be completed without stopping recording/reproducing processing.

In the above example, since the absolute value of difference between the temperature T0 and the temperature T1 is compared with the predetermined temperature difference Tn, additional correction can be made not only in the case that temperature of the objective lens 116 rises after start of operation, but also in the case that the temperature lowers.

The temperature difference Tn need not be limited to one value. For example, the temperature difference may have different values for corrections in spherical aberration and in tilt, or between corrections in temperature rising and in temperature lowering, or may have different values between all items, any of which is within a scope of the example. According to this, an item being particularly problematic in temperature characteristic may be appropriately subjected to additional correction.

While a case that a certain time is kept from the step S63 to the step S64 is described, this is still not a limiting condition, and operation from the step S64 to the step S68 may be performed without keeping the certain time. According to this approach, when the absolute value exceeds the predetermined temperature difference Tn in the step S66, additional correction can be immediately made. In addition to such a method using time trigger, a method may be used, where temperature is confirmed when a seek operation is performed, in which the objective lens is moved in a radial direction, or when a focus jump operation is performed, in which a focus is changed to that for a different recording layer of a multi-layer disk.

Moreover, when the predetermined temperature difference Tn is made to have a small value, additional correction can be made immediately after temperature difference occurs.

While other modifications may be considered by variously modifying operation, any of the modifications are within a scope of the example.

While the example has been described in detail hereinbefore, it will be appreciated that the present subject is not limited to the example of an optical disk recording/reproducing apparatus and a method of correcting a temperature characteristic of an optical pickup of the optical disk recording/reproducing apparatus described herein, and may be widely applied to another optical disk recording/reproducing apparatus and another method of correcting a temperature characteristic of an optical pickup of the optical disk recording/reproducing apparatus.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An optical disk recording and/or reproducing apparatus that uses an optical disk as a recording medium, and has an optical pickup that records and reproduces a signal into/from the recording medium, the optical pickup comprising:
    a laser diode that generates laser light for performing the recording and reproducing;
    an objective lens for irradiating the laser light from the laser diode onto the recording medium, and condensing reflected light from the recording medium;
    an actuator that is mounted with the objective lens, and performs at least focus adjustment of the objective lens, tracking adjustment of the objective lens to a recording track of the recording medium, and tilt adjustment for adjusting tilt of the objective lens for facing the recording medium;
    a spherical aberration correction element for correcting spherical aberration of the objective lens;
    a detector that detects laser light condensed by the objective lens and converts the light into an electric signal; and
    a temperature sensor that detects internal temperature of the optical pickup,
    wherein the optical disk recording/reproducing apparatus comprises:
        a signal generation circuit that calculates the electric signal outputted from the detector to generate at least a focusing error signal and a tracking error signal;
        a focus-drive-signal generation module that generates a focus drive signal for focus adjustment of the actuator based on the focusing error signal generated by the signal generation circuit;
        a tracking-drive-signal generation module that generates a tracking drive signal for tracking adjustment of the actuator based on the tracking error signal generated by the signal generation circuit;
        a signal variation measurement module that measures signal variation of at least one of the focusing error signal, the tracking error signal, the focus drive signal, and the tracking drive signal;
        a spherical-aberration-correction drive signal generation module that determines the signal variation measured by the signal variation measurement module, and generates a spherical-aberration-correction drive signal in the case that the signal variation is larger than a predetermined value; and
        a spherical-aberration-correction element drive circuit that is inputted with the spherical-aberration-correction drive signal from the spherical-aberration-correction drive signal generation module to drive the spherical aberration correction element, and wherein the spherical-aberration-correction drive signal generation module measures amount of temperature rise of the objective lens with respect to the internal temperature detected by the temperature sensor based on the signal variation measured by the signal variation measurement module, and generates the spherical-aberration-correction drive signal in the case that change in temperature as the sum of the amount of temperature rise and the internal temperature is larger than a predetermined value.

2. The optical disk recording/reproducing apparatus according to claim 1, wherein the signal variation measurement module measures voltage variation or current variation of at least one of the focusing error signal, the tracking error signal, the focus drive signal, and the tracking drive signal, and thus obtains the signal variation.

3. The optical disk recording/reproducing apparatus according to claim 1, comprising:
  an actuator drive circuit that is inputted with the focus drive signal from the focus-drive-signal generation module, and drives the actuator to perform focus adjustment of the objective lens.

4. The optical disk recording/reproducing apparatus according to claim 1, comprising:
  a tilt-drive-signal generation module that generates a tilt drive signal based on the signal variation measured by the signal variation measurement module; and
  an actuator drive circuit that is inputted with the tilt drive signal from the tilt-drive-signal generation module, and drives the actuator to perform tilt adjustment of the objective lens.

5. The optical disk recording/reproducing apparatus according to claim 1, comprising:
  a laser-diode-drive-signal generation module that generates a laser-diode drive signal based on the signal variation measured by the signal variation measurement module; and
  a laser diode drive circuit that is inputted with the laser diode drive signal from the laser-diode-drive-signal generation module, and drives the laser diode to perform adjustment of light quantity.

6. A method of correcting a temperature characteristic of an optical pickup of an optical disk recording/reproducing apparatus that uses an optical disk as a recording medium, and has the optical pickup that records and reproduces a signal into/from the recording medium, the method comprising:
  initially correcting a temperature characteristic of the optical pickup based on internal temperature of the optical pickup;
  in a first temperature measurement step: generating at least a focusing error signal and a tracking error signal from output of the optical pickup, and obtaining temperature as the sum of amount of temperature rise of an objective lens mounted on the optical pickup, the amount of temperature rise being measured based on variation of a signal generated in a system control circuit based on the focusing error signal or the tracking error signal, and the internal temperature of the optical pickup;
  performing a recording/reproducing operation using the optical pickup;
  in a second temperature measurement step: generating at least a focusing error signal and a tracking error signal from output of the optical pickup after the recording/reproducing operation of the recording/reproducing step is started, and obtaining temperature as the sum of amount of temperature rise of the objective lens mounted on the optical pickup, the amount of temperature rise being measured based on variation of a signal generated in the system control circuit based on the focusing error signal or the tracking error signal, and the internal temperature of the optical pickup; and
  additionally correcting aberration caused by temperature change of the optical pickup based on the temperature obtained in the second temperature measurement step upon an absolute value of difference between the temperature obtained in the first temperature measurement step and the temperature obtained in the second temperature measurement step being larger than a predetermined value,
  wherein the temperature characteristic is corrected based on variation of an electric signal.

7. The method of correcting a temperature characteristic of an optical pickup of an optical disk recording/reproducing apparatus according to claim 6, wherein
  the signal variation for measuring the amount of temperature rise of the optical pickup is signal variation of at least one of the focus drive signal and the tracking drive signal being the basis of a signal for driving the actuator of the optical pickup, the drive signals being generated from the focusing error signal and the tracking error signal respectively.

8. The method of correcting a temperature characteristic of an optical pickup of an optical disk recording/reproducing apparatus according to claim 6, wherein correction amount to be required depending on a condition of temperature change is stored beforehand in a memory.

* * * * *